United States Patent Office 3,424,905
Patented Jan. 28, 1969

3,424,905
PROCESS FOR PRODUCING NEGATIVE
HYDROGEN IONS
Bailey L. Donnally, Lake Forest, Ill., assignor to Lake Forest College, Lake Forest, Ill., a not-for-profit corporation of Illinois
No Drawing. Filed Apr. 25, 1966, Ser. No. 544,720
U.S. Cl. 250—84   10 Claims
Int. Cl. H01j 37/08

ABSTRACT OF THE DISCLOSURE

Negatively charged hydrogen ions may be produced by passing a beam of relatively low energy (e.g., in the range of up to several kiloelectron volts) through the vapor of an alkali atom. It is believed that the negative hydrogen ions are produced from ground state hydrogen atoms which in turn are derived from the protons via metastable intermediates. In particular, it is believed that the beam of protons is converted into ground state hydrogen atoms by first converting the beam of protons into metastable hydrogen atoms which are quenched by collision to ground state. A second possible means for such conversion involves converting the beam of protons into hydrogen atoms, the electrons of which are in the $2p$ level and other excited states, which atoms spontaneously decay directly to the ground state. Since the various conversions are all achieved by interaction of the particle and an alkali atom, the entire conversion process may be carried out using the same alkali atom in a single collision region.

---

This application is a continuation-in-part of applicant's co-pending U.S. Patent application, Ser. No. 452,781, filed May 3, 1965.

The present invention generally relates to a process for producing negative hydrogen ions and more specifically relates to a process for producing polarized negative hydrogen ions.

One process for producing negative hydrogen ions from protons is described in applicant's aforesaid Ser. No. 452,781 application. The method therein described comprises: passing a beam of relatively low energy (e.g., up to about 2000 electron volts) protons through atoms of a metal selected from the group consisting of cesium, rubidium, potassium, and sodium in order to produce a beam of particles including metastable hydrogen atoms; thereafter deflecting charged particles from the metastable hydrogen atom containing beam; and passing the beam of neutral metastable hydrogen atoms through a region containing a gas having an ionization energy of at least about 11.0 electron volts in order to selectively ionize metastable hydrogen atoms in preference to ground state hydrogen atoms.

The present invention comprises yet another method of producing polarized negative hydrogen ions and includes a method for converting ground state hydrogen atoms into negative hydrogen ions in yields substantially higher than has heretofore been possible. The present invention further includes another method of converting metastable hydrogen atoms produced in the manner described in said co-pending application into negative hydrogen ions.

It is, therefore, a primary object of the present invention to provide a method for producing a beam of negative hydrogen ions from protons in relatively high yield.

Another object of the present invention is to provide a process of the character described which may be employed to convert ground state hydrogen atoms into polarized negative hydrogen ions.

Yet another object is to provide a process for converting a beam of relatively low energy protons into negatively charged hydrogen ions in substantial yield.

A further object is to provide a process for producing beams of relatively low energy negative hydrogen ions for use in basic atomic and nuclear physics research.

These and other objects, advantages, and features of the present invention will hereinafter appear, and, for purposes of illustration, but not of limitation, exemplary embodiments of the present invention are described hereinafter.

Briefly, the present invention is a process for producing negatively charged hydrogen ions which comprises passing ground state hydrogen atoms through the vapor of an alkali atom and thereafter separating (as by electrostatic or magnetic means) the negative hydrogen ions so produced. The present invention further comprises the step of converting a beam of relatively low energy protons into ground state hydrogen atoms and thereafter converting the ground state atoms into negative hydrogen ions. The conversion of protons into ground state hydrogen atoms may preferably be achieved by passing a beam of relatively low energy protons through the vapor of an alkali atom, with the ground state atoms being produced via metastable intermediates.

A beam of protons for use in the present invention may be obtained from a conventional proton source, such as a Nier-type source, in which protons are obtained by electron bombardment of molecular hydrogen. The protons are preferably of relatively low energy, e.g., in the range of up to several kiloelectron volts.

Appropriate electrostatic or magnetic means (e.g., a conventional electrostatic analyser) may be employed to separate the beam of negative hydrogen ions produced by the process of the present invention and means (e.g., a conventional Faraday cup) may be employed to measure the current of negative hydrogen ions thereby produced.

Of the alkali atoms, cesium and potassium have been shown to be effective in carrying out the process of the present invention. However, the other alkali atoms could be expected to be effective since the characteristic believed to be most important insofar as the process of the present invention is concerned is the ionization energy of the operative material. In view of the similarity of wave functions of the alkali atoms and further in view of the relatively close relationship between the ionization energies of the various alkali atoms, it would be expected that substantially any alkali atom could be used to carry out the process of the present invention.

The step of converting a proton beam into ground state hydrogen atoms is believed to occur in accordance with either of two mechanisms. The first mechanism is a two step conversion process in which: (a) a beam of protons is first converted into metastable hydrogen atoms; and (b) the metastable hydrogen atoms are thereafter quenched to the ground state. Each of these two steps occurs by means of a collision reaction between the starting material and an alkali atom. The described two-step conversion mechanism may be depicted as follows in equation form:

$$H^+ + M \rightarrow H(2s) + M^+$$
$$H(2s) + M \rightarrow H(1s) + M$$

where M is an alkali atom. Since each of the two above-mentioned steps in the conversion process may be carried out using the same alkali atom, the process can conveniently be carried out in a single collision region (i.e., in a single gas cell).

A second mechanism by which protons are converted into ground state atoms is a single step conversion process in which a beam of protons is converted into a beam of neutral hydrogen atoms, the electrons of which are in the 2p energy level, which atoms emit gamma rays and thereby decay directly to ground state 1s hydrogen atoms. The described second mechanism may be depicted in equation form as follows:

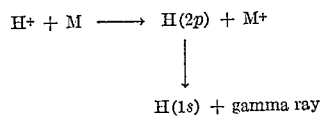

where M is an alkali atom.

Experimental results indicate that the second above-described reaction mechanism (i.e., the single step mechanism) predominates over the two-step conversion mechanism, although apparently, as the alkali atom vapor pressure increases, the two-step collision process becomes more significant.

The conversion of ground state hydrogen atoms (produced from protons by either of the suggested mechanisms or obtained from any other source) into negative hydrogen ions via a collision reaction with an alkali atom, occurs in accordance with the following reaction:

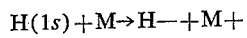

where M is an alkali atom. Since the ground state atoms may be obtained from protons via collision with alkali atoms (in accordance with either a single or two-step mechanism, as described above), a unitary process for producing negative hydrogen ions from protons may be carried out by using the same alkali atom for each step of the process and by carrying out each step of the unitary process in a single collision region (i.e., in the same gas cell).

The process of the present invention may be illustrated by the following examples.

Example I

A beam of protons of varying energies was obtained from a Nier-type source and, by means of a conventional sector magnetic analyser, was collimated and passed through a collision region. Initially, the proton current itself was measured by means of a conventional electrostatic analyser for Faraday cup. Thereafter, cesium atoms were admitted to the collision region, and the electrostatic analyser was adjusted so as to measure the emerging negative hydrogen ion current. The following table lists the ratio of the emerging negative hydrogen ion current to the incident proton current for proton beams of various energies at the optimal cesium vapor thickness. The $H^-/H^+$ ratios achieved within the preferred range of 350 ev. to 750 ev. were all greater than 0.08 (i.e., 8%) and in several instances approached 0.10 (i.e., 10%). Thus, under optimal conditions, the yields that may be achieved with the process of the present invention approach the level of 10%.

TABLE I.—CESIUM COLLISIONS

| Proton energy (ev.) | $(H^-/H^+)$ max. | Vapor thickness for max. yield ($\mu$ cm.) |
|---|---|---|
| 300 | .062 | 33 |
| 350 | .080 | 33 |
| 450 | .094 | 33 |
| 550 | .097 | 29 |
| 600 | .087 | 27 |
| 650 | .098 | 23 |
| 700 | .096 | 27 |
| 750 | .087 | 27 |
| 1,000 | .068 | 21 |
| 2,000 | .030 | 21 |
| 2,800 | .016 | 21 |

Example II

A beam of protons was converted into a beam of negative hydrogen ions in accordance with the procedure set forth in Example I, except that potassium was substituted for cesium as the alkali atom. Table II contains $H^-/H^+$ ratios for proton beams of energies between about 400 and 3200 electron volts. Maximum yields were obtained with vapor thicknesses of about 25 micron centimeters. The data of Table II verify the effectiveness of potassium in carrying out the process of the present invention, with yields of greater than 6% being achieved at optimal proton energies.

TABLE II.—POTASSIUM COLLISIONS

| Proton energy, ev. | $(H^+/H^-)$ max. |
|---|---|
| 400 | .009 |
| 700 | .011 |
| 1000 | .010 |
| 1500 | .063 |
| 2000 | .054 |
| 3200 | .030 |

As established by the data of Tables I and II, where cesium is the alkali atom, optimal yields are obtained with protons of less than about 1000 ev. and preferably between about 350 and 750 ev. Where potassium is the alkali atom optimal yields are obtained with protons of less than about 3200 ev. and preferably between about 1500 and 3200 ev.

The yield of negative hydrogen ions obtained with the process of the present invention is influenced by the density of the alkali atom vapor in the collision region and by the length of the collision region. These variables are conveniently expressed in product form as a vapor thickness for the gas. For example, at a pressure of 5 microns of mercury and with a collision length of 5 microns, the vapor thickness is 25 micron-centimeters. In accordance with the present invention and where cesium is employed as the alkali metal, optimal yields of negative hydrogen ions are obtained at cesium vapor thicknesses ranging from about 33 micron centimeters (where the proton energies approximate about 300 electron volts) to about 21 micron centimeters (where the energies of the proton beam are about 2000 electron volts or greater). Where optimal proton energies of 350–750 electron volts are employed, the range of cesium vapor thicknesses is about 33 to 27 micron centimeters. Vapor thicknesses above and below the levels therein specified may be employed, although with diminished effectiveness.

The present process has particular utility for converting polarized protons (i.e., protons, the spins of which are aligned) into polarized negative hydrogen ions (i.e., negative hydrogen ions, the nuclear spins of which are aligned). In order that the process of the present invention can be successfully employed to convert polarized protons into polarized negative hydrogen ions, it is necessary that the collision region in which protons collide with alkali metal atoms be maintained in a magnetic field of sufficient strength to maintain the nuclear polarization of the particles, that is, nuclear spins will be "scrambled" due to the coupling of electron spins to nuclear spins as electrons are added to the protons, unless a strong magnetic field is imposed during the various collision steps.

The process of the present invention for producing a beam of negative hydrogen ions in a relatively high yield has utility in various atomic and nuclear physics basic research activities. The process is particularly useful, for example, when used in connection with a conventional tandem-type accelerator, which requires an input of negatively charged particles.

The process of the present invention may also be employed to carry out a conversion of deuterons to negative deuterium ions. Yields of negative deuterium ions are of the same magnitude as those for negative hydrogen ions at corresponding deuteron velocities. Thus, the term "hydrogen" as used in the appended claims should be understood to generically encompass both the normal hydrogen isotope ($_1H^1$) and the heavy hydrogen isotope deuterium ($_1D^2$). Similarly, the term "proton" therein should be understood to encompass deutrons as well as protons.

Although the subject invention has been described with reference to multiple step reaction mechanisms in which all of the collision reactions occur in the same collision region (i.e., in the same gas cell), each of the discrete steps of the reaction could be carried out separately and sequentially.

In accordance with the present invention a process is provided for converting ground state hydrogen atoms into negative hydrogen ions. A process is further provided for converting low energy protons, preferably polarized protons, into a beam of negatively charged hydrogen ions, preferably polarized negative hydrogen ions, in relatively high yield.

While the process of the present invention has been described with reference to certain preferred embodiments, it will be obvious to one skilled in the art that various changes, alterations, and modifications may be made in the reactants and reaction conditions of the process of the present invention, without departing from the spirit and the scope of the appended claims.

What is claimed is:

1. A process for converting ground state hydrogen atoms into negative hydrogen ions comprising passing a beam of said atoms through the vapor of an alkali atom in a collision region in order to produce a beam comprising ground state hydrogen atoms and negative hydrogen ions and thereafter separating the negative hydrogen ions from the ground state hydrogen atoms of said second mentioned beam.

2. A process, as claimed in claim 1, wherein the alkali atom is a member selected from the group consisting of cesium and potassium.

3. A process for producing negative hydrogen ions comprising passing a beam of relatively low energy protons through a collision region containing vapor of an alkali atom in order to produce a beam comprising negative hydrogen ions, ground state hydrogen atoms, and protons and thereafter separating the negative hydrogen ions from the ground state hydrogen atoms and protons.

4. A process, as claimed in claim 3, wherein the alkali atom is cesium and wherein the protons of said beam have energies lying in the range of about 300 up to about 2000 electron volts.

5. A process, as claimed in claim 4, wherein the optimal vapor thickness of the cesium in the collision region lies in the range of about 33 to 21 micron centimeters.

6. A process, as claimed in claim 5, wherein the protons of said beam have energies lying in the range of about 350–750 electron volts and wherein the optimal vapor thickness of cesium lies in the range of about 27 to 33 micron centimeters.

7. A process, as claimed in claim 3, wherein the alkali atom is potassium, the vapor thickness of which is about 25 micron-centimeters, and wherein the protons of said beam have energies lying in the range of about 1000 up to about 3200 electron volts.

8. A process, as claimed in claim 3, wherein the protons of said beam are polarized and wherein a strong magnetic field is maintained in the collision region, whereby the negative hydrogen ions produced by the process are polarized.

9. A process, as claimed in claim 3, wherein the conversion of protons into negative hydrogen ions is accomplished by the steps of:
   converting said beam of protons into metastable hydrogen atoms [H(2s)];
   quenching said metastable hydrogen atoms to the ground state [H(1s)]; and
   converting the ground state hydrogen atoms into negative hydrogen ions,
   each of the three steps occurring by means of a collision reaction between the starting material and said alkali atom vapor.

10. A process, as claimed in claim 3, in which the conversion of protons into negative hydrogen ions is accomplished by the steps of:
   converting said beam of protons into hydrogen atoms, the electrons of which are in the 2p level, which atoms decay directly to the ground state [H(1s)]; and
   converting the ground state hydrogen atoms into negative hydrogen ions,
   each of the steps occurring by means of a collision reaction between the starting material and said alkali atom vapor.

References Cited

UNITED STATES PATENTS 3,136,908   6/1964   Weinman _____ 313—63

WILLIAM F. LINDQUIST, *Primary Examiner.*

U.S. Cl. X.R.

250—4.2; 313—63